F. E. BERRY.
TRACTOR.
APPLICATION FILED FEB. 25, 1919.

1,360,078.

Patented Nov. 23, 1920.
2 SHEETS—SHEET 1.

INVENTOR
Francis E. Berry
BY John A. Naismith
HIS ATTORNEY

F. E. BERRY.
TRACTOR.
APPLICATION FILED FEB. 25, 1919.

1,360,078. Patented Nov. 23, 1920.
2 SHEETS—SHEET 2.

INVENTOR
Francis E. Berry
John A. Naismith
BY HIS ATTORNEY

UNITED STATES PATENT OFFICE.

FRANCIS E. BERRY, OF SAN JOSE, CALIFORNIA, ASSIGNOR OF ONE-HALF TO ROBERT BRUNN, OF SAN FRANCISCO, CALIFORNIA, AND WALTER BRUNN, OF SAN JOSE, CALIFORNIA.

TRACTOR.

1,360,078.     Specification of Letters Patent.     Patented Nov. 23, 1920.

Application filed February 25, 1919. Serial No. 379,071

*To all whom it may concern:*

Be it known that I, FRANCIS E. BERRY, a citizen of the United States, and resident of San Jose, in the county of Santa Clara and State of California, have invented certain new and useful Improvements in Tractors, of which the following is a specification.

My invention relates to tractors of the type set forth in a general way in my copending application Serial No. 249,481, filed August 12, 1918, power transmitting mechanism, in which independently controlled drive wheels are mounted upon a suitably supported tractor frame.

A tractor for use in orchard, garden and general farm work should have several pronounced characteristics, the absence of any one of which either reduces its practical utility or interferes materially in its salability. For field work is should be sufficiently heavy to secure good traction on a base sufficiently wide and long to operate positively on surfaces badly broken and rough with ruts, clods, ridges, etc. For orchard work should be added the requirements of compactness and flexibility in order to permit the working of the ground under the trees and close to the tree trunks and to permit the proper manipulation of the machine at the end of each row of trees. For garden work should be added the requirement of adjustability so that the machine may be adapted for use between rows of growing things.

It is the object of my invention to provide a tractor that will not only satisfactorily meet all of the requirements hereinbefore set forth but which, also, can be operated for long periods without undue strain upon the driver; that embodies a minimum number of parts in its construction and is therefore easy to operate, easy to repair, and which can be manufactured at low cost and operated at a minimum expense.

With these and other objects in view my invention consists in the novel and useful combination and relative arrangement of parts, members and features as hereinafter described, shown in the drawings and finally pointed out in the claims.

In the drawings:—

Similar characters of reference indicate similar parts throughout the several views.

Figure 2:
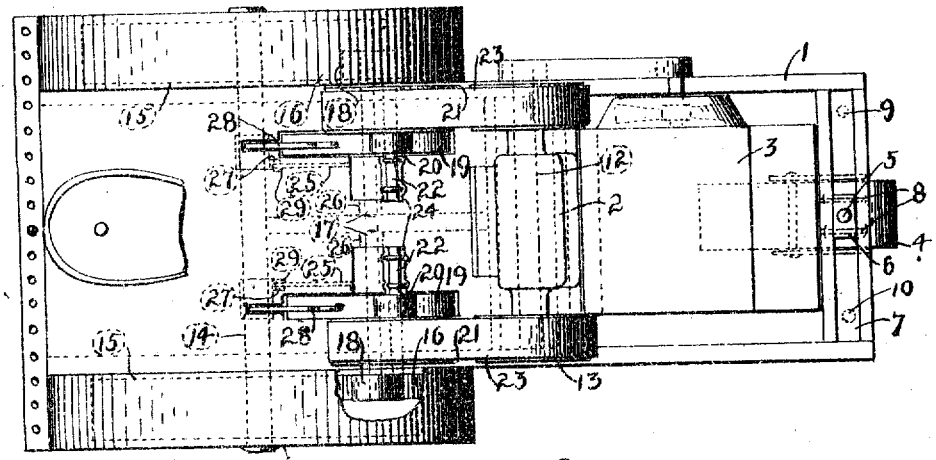
Fig. 2 is a plan view of the tractor shown in Fig. 1.

Referring now more particularly to the drawings, 1 indicates the tractor frame, 2 the engine mounted thereon and 3 the fuel supply. At 4 is shown a tiller wheel freely revoluble about a vertical axis by means of its vertical shaft 5 being positioned in bearings 6, and bearings 6 being secured in transversely positioned slot 7 in frame 1. Bearings 6 are normally locked in position in the center of slot 7 by means of any suitable mechanism as bolts 8, but may be shifted and locked in position to the right or left of the center line as indicated in dotted lines at 9 and 10 respectively.

At 12 is shown a shaft operated by motor 2 and carrying a pair of fly-wheels 13 balanced one on each side of the median line of the tractor frame, the shaft 12 being operated by engine 2 in the usual manner and with the usual connecting mechanisms.

At 14 is shown a shaft mounted transversely on frame 1 and carrying drive wheels 15, each drive wheel 15 being provided with an internal gear 16. The driving mechanism connecting each drive wheel 15 with its respective fly-wheel 13 is as follows. A shaft 17 is mounted to rotate on frame 1 as shown and carries a pinion 18 which is permanently in mesh with internal gear 16, and a spur gear 19. Spur gear 19 meshes with a pinion 20, which, together with pulley 21 to which it is secured, is revolubly mounted on jack-shaft 22, and pulley 21 being connected to fly-wheel 13 by belt 23. Jack-shaft 22 is mounted in a cradle 24 formed on the upper end of bell-crank 25, said bell-crank 25 being pivotally mounted on box 26 in which shaft 17 rotates as shown. The lower end of bell-crank 25 extends rearwardly of the machine to a point adjacent to shaft 14 where it is connected to a projection 27 on lever 28 by link 29.

The result of this construction is, that by throwing lever 28 forwardly bell-crank 25 is operated to throw pulley 21 into operative engagement with belt 23. Since the gear connections hereinbefore described are in permanent engagement, one with the other, the operation of the pulley 21 in the direction indicated by the arrow serves to drive the drive wheel forward. This pivoted arrangement of meshing gears also has the effect of automatically maintaining pulley 21 in operative relation with belt 23 because pinion 20 is operating against gear 19 and forcing the same in the opposite direction. If lever 28 is thrown backward to a point as indicated in dotted lines at 30 then the bell-crank mechanism operates to throw pulley 21 into frictional engagement with fly-wheel 13 and out of engagement with the belt 23. This connection operates to reverse the direction of rotation of pulley 21 and the revoluble parts connected thereto, the operation of pinion 20 against gear 19 serving to maintain said pulley 21 in positive frictional engagement with fly-wheel 13. By throwing lever 28 into a position as indicated in dotted lines at 31 the bell-crank mechanism is operated to position pulley 21 in a neutral inoperative position between belt 23 and fly-wheel 13. The lever 28 may be held in the last mentioned position in any suitable manner as by a catch 32 on lever 28, and a notch 33 in a bar 34 positioned on frame 1.

It may now be clearly seen that by the above described arrangement the drive wheels 15 may be driven forwardly or backwardly in unison or separately to drive the tractor forwardly or backwardly or to turn the same in either direction.

In operating in a garden between the rows of garden products the tiller wheel 4 may be shifted to the right or left as desired to fit in between said rows, or may be offset if necessary to counter act any sidewise pull of the plows which may occur under certain conditions. A further advantage of this construction is that the tractor may be adjusted to operate astride a ridge without breaking the same down, a feature of considerable importance in some stages of orchard work.

It is also pointed out that the combination of a pair of independently operating belt and friction transmission mechanisms together with one or more freely movable casters permits the elimination of a multitude of working parts and wearing surfaces and therefore adds materially to the practicability and durability of the machine as well as to increase the facility with which the machine may be started and stopped or turned in any direction.

The combination of independent pairs of belt and friction drives is also of value in some cases of heavy side pull because they permit the full application of power to the drive wheel upon the side subjected to the pull while the power may be applied to the other drive wheel in any desired amount to maintain the tractor on a straight line of travel.

Figure 4:
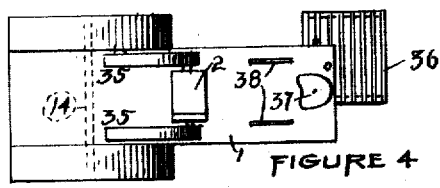
Fig. 4 is a diagrammatical illustration of my improved tractor in which the frame is partly supported by an earth tilling implement.
Figure 5:
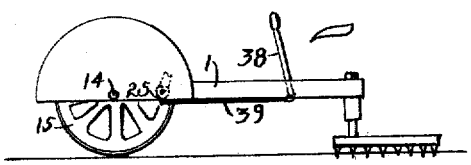
Fig. 5 is a side elevation of the structure shown in Fig. 4.

In the modification indicated in Figs. 4 and 5 the transmission mechanisms are indicated at 35 and are constructed and assembled as hereinbefore described. Instead, however, of mounting the tiller wheel 4 as above described I have substituted therefor an earth tilling implement as 36 which itself supports one end of frame 1. In a case of this kind the forward movement of the tractor would be the reverse of that described and consequently the driver's seat should be positioned as at 37 and the transmission mechanism operated in any suitable manner as by levers 38 connected to bell-cranks 25 by rods 39.

Figure 1:
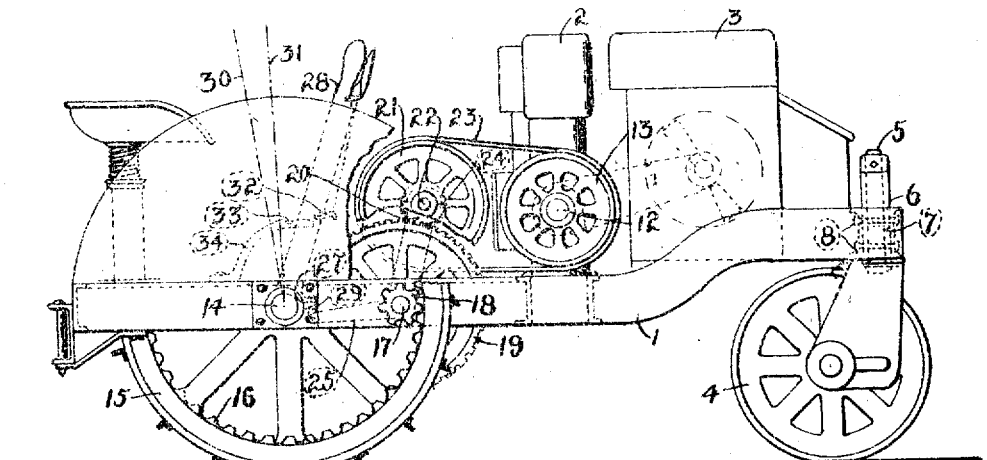
Figure 1 is a side elevation of my improved tractor.
Figure 3:
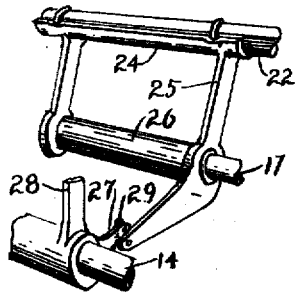
Fig. 3 is a detail perspective view of a portion of the transmission mechanism.
Figure 6:
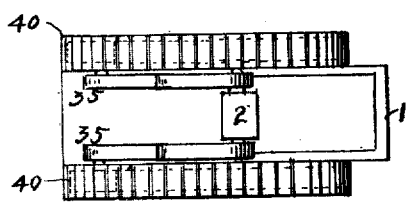
Fig. 6 is a diagrammatical illustration of my improved tractor adapted for use as a track laying tractor.

In Fig. 6 it is shown that the frame 1 may be mounted upon a pair of track laying mechanisms operated through the medium of drive wheels 15, in this case the tractor operates in substantially the same manner as described in connection with Figs. 1 and 2 but the caster is eliminated. The tracks are indicated at 40.

Figure 7:
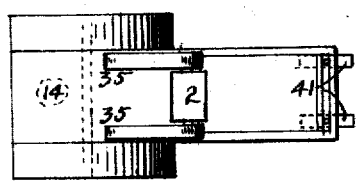
Fig. 7 is a diagrammatical illustration of a tractor embodying my invention and provided with a pair of tiller wheels.

Fig. 7 illustrates a modification of my invention in which a pair of casters 41 are mounted on the forward end of the tractor. Such a construction may be desirable for large machines designed for heavy work or to meet certain conditions in practical application.

It is understood, of course, that while I have herein shown and described certain forms of construction and methods of operation, desired changes may be made within the scope of the following claims without departing from the spirit of my invention.

I claim:

1. A tractor including a frame operatively mounted upon suitable supporting means including a pair of drive wheels and having a motor and a motor driven shaft operatively mounted thereon, and a reversing transmission mechanism operatively connecting said shaft with each of said drive wheels, each of said reversing transmission mechanisms including a belt drive for transmitting power to operate said drive wheels in one direction, a friction drive for transmitting power to operate said drive wheels in the opposite direction, and gear connections for automatically maintaining said belt drive or said friction drive in an operative position.

2. A tractor including a frame operatively mounted upon a pair of suitable supporting and driving means and having a motor and a motor driven shaft operatively mounted thereon, a reversing transmission mechanism operatively connecting said shaft with each of said driving means, each of said reversing transmission mechanisms including a belt drive for transmitting power to operate said driving means in one direction and a friction drive for transmitting power to operate said driving means in the opposite direction, and gear connections for automatically maintaining said belt drive or said friction drive in an operative position.

3. A tractor including a frame operatively mounted upon a pair of suitable supporting and driving means and having a motor and a motor driven shaft operatively mounted thereon, and a reversing transmission mechanism operatively connecting said shaft with each of said driving means, each of said reversing transmission mechanisms including a belt drive for transmitting power to operate said driving means in one direction and a friction drive for transmitting power to operate said driving means in the opposite direction, gear connection for automatically maintaining said belt drive or said friction drive in an operative position, and means for maintaining said transmission mechanism in an inoperative position.

4. A tractor including a frame, a caster and a pair of drive wheels supporting the same, a motor and a motor driven shaft operatively mounted on said frame, and a reversing transmission mechanism operatively connecting said shaft with each of said drive wheels, each of said reversing transmission mechanisms including a belt drive for transmitting power to operate said drive wheel in one direction, a friction drive for transmitting power to operate said drive wheel in the opposite direction, and gear connections for automatically maintaining said belt drive or said friction drive in an operative position.

5. A tractor including a frame, a caster and a pair of drive wheels supporting the same, a motor and a motor driven shaft operatively mounted on said frame, and a reversing transmission mechanism operatively connecting said shaft with each of said drive wheels, each of said reversing transmission mechanisms including a belt drive and a friction drive whereby the adjacent drive wheel may be operated in either direction and gear connections for automatically maintaining said belt drive or said friction drive in an operative position, and means whereby either belt drive or friction drive may be thrown into operation or simultaneously rendered inoperation.

6. A tractor including a frame, a caster and a pair of drive wheels supporting the same, a motor and a motor driven shaft operatively mounted on said frame, a pair of jack-shafts, a permanent driving connection between each of said jack-shafts and the adjacent drive wheel, a belt driving connection between said motor driven shaft and each of said jack-shafts, a frictional driving connection between each of said jack-shafts and said motor driven shaft, and independent means for shifting each of said jack-shafts without destroying the driving connection between the same and the adjacent drive wheel to bring either the belt drive or the friction drive into action or to render the same inoperative, said permanent driving connections being adapted to automatically maintain said belt drive or said friction drive in an operative position.

7. A tractor including a frame, a caster and a pair of internally geared drive wheels supporting the same, a motor and a motor driven shaft operatively mounted on said frame, a pair of jack-shafts, permanent gear connections between each of said jack-shafts and the internal gear of the adjacent drive wheel, a belt driving connection between said motor driven shaft and each of said jack-shafts, a frictional driving connection between said motor driven shaft and each of said jack-shafts, and means whereby each of said jack-shafts may be moved to bring either the belt drive or the friction drive into action or into a neutral position between the same, said gear connections being adapted to automatically maintain said belt drive or said friction drive in an operative position.

8. A tractor including a frame, a caster and a pair of internally geared drive wheels supporting the same, a motor and a motor driven shaft operatively mounted on said frame, a pair of fly-wheels mounted on said shaft, a pair of shafts revolubly mounted transversely of said frame and carrying pinions in permanent engagement with said internally geared drive wheels, a gear coöperating as a unitary structure with each pinion, a jack-shaft pivotally mounted upon each transverse shaft adjacent to each of said last mentioned gears, a pinion mounted to rotate on each of said jack-shafts and in permanent engagement with the last mentioned adjacent gear, a pulley revolubly mounted on each jack-shaft to coöperate as a unitary structure with the adjacent pinion, a belt connection between each of said pulleys and the adjacent fly wheel, and means for throwing either of said pulleys into operative engagement with its respective belt for driving the revoluble parts connected thereto in one direction, or into frictional engagement with its respective fly wheel for driving said parts in an opposite direction, or into a neutral position between the two.

Executed this 17th day of February, 1919

FRANCIS E. BERRY